United States Patent [19]

Ardueser et al.

[11] Patent Number: 4,941,311
[45] Date of Patent: Jul. 17, 1990

[54] WRAP MATERIAL ROLL HOUSING COVER HAVING SEALED HINGE JOINT AND GAS SPRING BIASING MEANS

[75] Inventors: William A. Ardueser, Ottumwa; George W. Rumph, Bloomfield; Henry D. Anstey, Ottumwa, all of Iowa

[73] Assignee: Deere & Company, Moline, Ill.

[21] Appl. No.: 370,555

[22] Filed: Jun. 23, 1989

[51] Int. Cl.⁵ ............................................. B65B 11/04
[52] U.S. Cl. ...................................... 53/587; 53/118; 53/389; 242/55.53
[58] Field of Search .................... 53/118, 389, 587; 56/391; 100/5, 88; 242/55.53

[56] References Cited

U.S. PATENT DOCUMENTS

| | | | |
|---|---|---|---|
| 3,010,338 | 11/1961 | Layton | 242/55.53 |
| 4,676,046 | 6/1987 | Verhulst et al. | 53/118 |
| 4,677,807 | 7/1987 | Verhulst et al. | 53/118 |
| 4,691,503 | 9/1987 | Frerich | 53/118 |
| 4,697,402 | 10/1987 | Anstey et al. | 53/118 X |
| 4,759,278 | 7/1988 | Viaud | 53/341 X |
| 4,775,109 | 10/1988 | Tegg | 242/55.53 X |
| 4,779,527 | 10/1988 | Ardueser et al. | 56/341 X |
| 4,798,044 | 1/1989 | Viaud et al. | 56/341 |

Primary Examiner—John Sipos
Assistant Examiner—Beth Bianca

[57] ABSTRACT

A mechanism for enveloping a large round bale with a surface wrap material such as plastic sheet or net includes a housing for holding a supply roll of the wrap material. The mechanism and, hence, the housing is mounted on the rear of a bale discharge gate. The housing includes a front wall defined by an upright panel secured across the rear of the gate and having an upper end portion projecting rearwardly and downwardly and a bottom wall spaced below the upper end portion of and being sloped upwardly and rearwardly relative to the front wall. The housing also includes a cover which is vertically pivotally mounted to a pair of brakets located just beneath the upper end portion of the front wall, the cover having a top wall having a forward edge portion which seals against the bottom of the upper end portion of the front wall when the cover is in a closed position. A pair of gas springs are connected between the cover and the brackets and have their line of action disposed relative to the pivot axis of the cover such that the cover is respectively biased to its closed and open positions when placed in these positions with the springs going over center as the cover is moved between the positions.

5 Claims, 4 Drawing Sheets

WRAP MATERIAL ROLL HOUSING COVER HAVING SEALED HINGE JOINT AND GAS SPRING BIASING MEANS

BACKGROUND OF THE INVENTION

The present invention relates to a mechanism for enveloping large round bales, formed in a bale-forming chamber, with a wrap material such as plastic sheet or net and more particularly relates to a cover of a housing for holding a supply of such wrap material in a position for being fed into the bale-forming chamber.

U.S. Pat. No. 4,691,503, granted to Josef Frerich on Sept. 8, 1987, discloses a surface wrap housing structure, of the type described above, mounted on the rear of a round baler discharge gate, the housing being defined by opposite side walls joined by top, rear and bottom walls so as to define a structure having an open front which is closed by an upright transverse front wall carried by the rear of the discharge gate. The open front structure is vertically pivotally mounted for movement about a horizontal transverse pivot axis located at a lower rear portion thereof for permitting the housing to be swung between a closed working position, wherein the front thereof is closed by the front wall, and a lowered wrap material roll loading position, wherein the top, rear and opposite sides of the housing cooperate to form a cradle for receiving the material roll. In a commercial embodiment of the housing disclosed in this patent, the front wall is provided with a rearwardly and downwardly angled upper portion which carries an elastomeric seal against which the underside of the upper forward portion of the open front housing structure seats for preventing entry of water, dust and other particulate material which might have the tendency to foul the surface wrap material such as by changing its frictional resistance to being pulled from the roll, it being noted that a constant frictional resistance is depended on for ensuring consistently acceptable feeding, wrapping and cutting off of the wrap material. While the provision of such a seal effectively excludes moisture and foreign material, the mounting of the seal to the front wall is a time consuming task and, hence, adds undesired cost to the structure. Additionally, various latches were required for performing such functions as securing the housing in its closed position, securing a roll brake applying arm in place and securing side shields or doors in place. Some of these latches included elastomeric straps which have the drawback that over time they tend to deteriorate due to being exposed to sunlight.

SUMMARY OF THE INVENTION

According to the present invention, there is provided an improved housing for holding a supply roll of surface wrap material for large round bales, and, more particularly, there is provided a housing structure designed to protectively house the wrap material without the use of elastomeric seals or latch straps.

An object of the invention is to provide a wrap material housing embodying a cover mounted in a way which obviates the need for using an elastomeric seal for excluding water and other foreign materials from the interior of the cover when the latter is in its closed position.

A more specific object of the invention is to provide a cover having a hinge structure at its upper forward portion, the hinge structure being so arranged relative to a rearwardly and downwardly inclined upper front wall portion of the housing that the cover engages the underside of the front wall portion so as to define a shingled effect which seals the cover when the latter is closed.

Yet another object of the invention is to provide a gas spring so located relative to the hinge structure that it functions to bias the cover to its open position as well as to its closed position.

These and other objects will become apparent from reading the ensuing description together with the appended drawings.

DESCRIPTION OF THE PREFERRED EMBODIMENT

Figure 1:
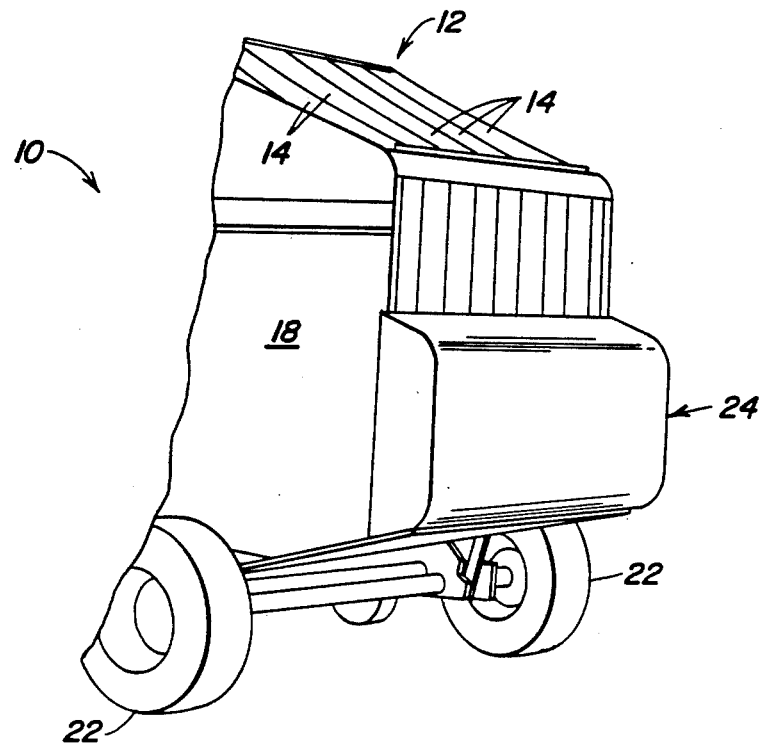
FIG. 1 is a left rear perspective view of the rear portion of a large round baler equipped with surface wrap material supply roll housing constructed in accordance with the principles of the present invention.
Figure 2:
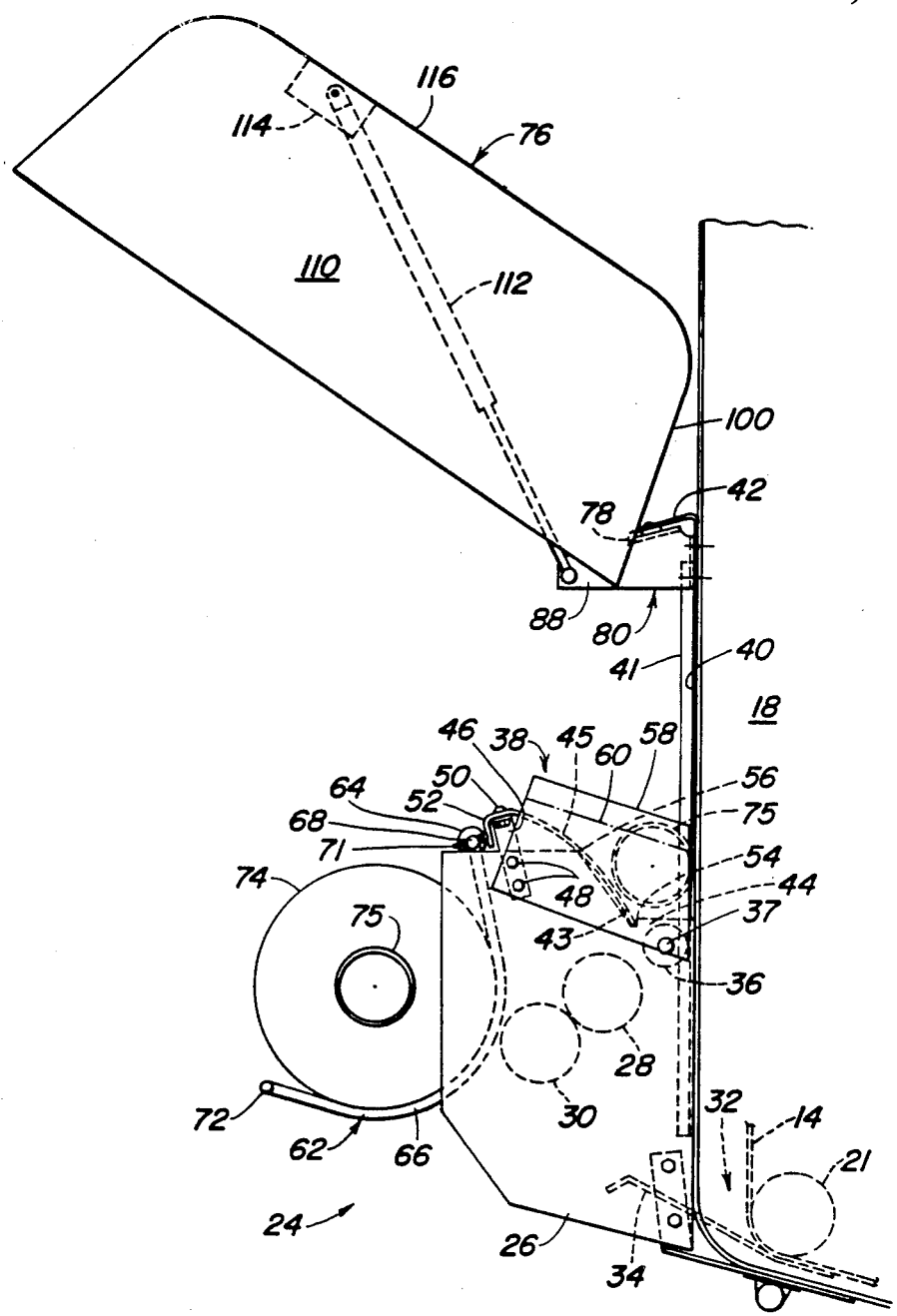
FIG. 2 is a right side elevational view of the supply roll housing showing the housing cover in an upwardly pivoted, open position, showing the supply roll loading bail or arm in a downwardly pivoted, roll loading position and showing a core of a depleted roll resting on a lower forward end portion of the curved bottom of the housing.
Figure 3:
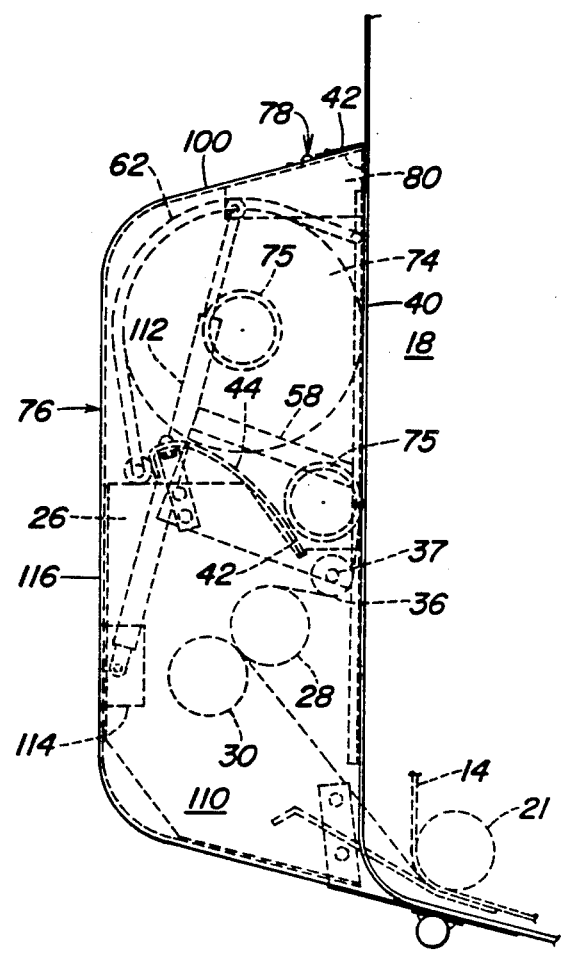
FIG. 3 is a view similar to that of FIG. 2 but showing the supply roll loading arm in an upwardly pivoted, roll deposit position and showing a full roll of wrap material that has been deposited on an upper rearward end of the curved bottom wall of the housing.

Referring now to FIG. 1, there is shown a rear portion of a large round baler 10 of a type including an expansible bale-forming chamber 12 formed in part by a plurality of side-by-side mounted, endless belts 14, in part by opposite sidewalls (not shown) of a forward portion of the baler supporting a first set of belt support rolls and in part by opposite side walls 18 of a bale discharge gate 20, these walls supporting a second set of belt support rolls including a lower rear roll 21 (FIGS. 2 and 3). A pair of ground wheels 22 support the baler for being towed over the ground by a tractor.

Referring now also to FIGS. 2–5, a bale wrapping mechanism 24 is shown mounted to the rear and lower portions of the discharge gate 20. The mechanism 24 includes opposite support walls 26 having forward, upright, transverse flanges bolted to similar flanges formed at the respective rear ends of the gate sidewalls 18. Extending between and having their opposite ends rotatably mounted in the support walls 26 are a pair of wrap material feed rolls 28 and 30, with the roll 28 being disposed above and forwardly of the roll 30 such that a material flight path, defined by a plane located tangentially to the rolls at their bite or nip, extends substantially into a bite or nip area 32 defined by a guide pan portion 34 and a portion of the belts 14 engaged with the lower rear support roll 21 carried by the gate 20. Located forwardly and above the upper feed roll 28 is a spreader roll 36 having its opposite ends rotatably supported by respective bearings (not shown) mounted in an upper forward location of the support walls 26 by respective bolts 37, the roll 36 carrying spiral flights (not shown) at its opposite ends with the flights being of opposite hand so as to spread wrap material engaged therewith to the full width of the spreader roll.

The bale wrap mechanism 24 includes a supply roll housing 38 having a front wall 40 defined by a vertical panel extending between and extending slightly beyond out-turned flanges defining the rear ends of the gate sidewalls 18, the front wall being secured to the flanges by bolts (not shown). As can be seen in FIG. 2, the opposite transverse ends of the front wall are defined by vertical flanges 41, while the upper end portion of the wall is defined by a downwardly and rearwardly sloped flange 42. The housing 38 further includes a downwardly and forwardly extending bottom wall 43, the bottom wall 43 and the front wall 40 converging toward a wrap material passage 44 defined between a forward edge of the wall 43 and the wall 40. The bottom wall 42 has an upper surface 45 curved convexly from front to rear with the curvature being specially selected to cooperate with the front wall so as to frictionally engage a roll of wrap material in a manner and for a purpose explained in more detail below. A pair of L-shaped straps 46 having out-turned upper ends are respectively secured to upper rear portions of the support walls 26 by a pair of spaced bolts 48. Upper rear locations of the curved housing bottom wall 43 overlie and are bolted, as at 50, to the out-turned ends of the straps 46. It is here noted that the rear end of the bottom wall 43 is bent downwardly so as to form a rounded corner 52 for engagement by a new supply roll of wrap material being loaded into the housing, in a manner described below. The wall 43 has its forward end captively engaged in respective notches or recesses 54 provided in upper forward locations of the support walls 26. A third point of support for the bottom wall 43 is provided by respective corners 56 defined at respective intermediate locations along upper edges of the walls 26. A roll of wrap material resting on the bottom wall 43 has its sideways movement limited by opposite containment plates 58, each being mounted to the support walls 26 by the pair of bolts 48 and by the bolt 37. The upper portion of each of the containment plates 58 is bent outwardly, as at 60, so that a rounded corner will be presented to the ends of the roll of wrap material being contained by the plates.

A wrap material roll loading bail or arm 62 is vertically pivotally mounted to upper rear locations of the support walls 26. Specifically, welded to respective upper edges of the walls 26 and defining a horizontal pivot axis are a pair of transversely aligned washers 64. The arm 62 is defined by a rod formed so as to define opposite legs 66 curved arcuately at a radius approximating that of a complete roll of wrap material, the legs terminating at respective out-turned ends 68 received in the washers 64 and provided with respective holes receiving containment pins 70. The ends of the legs 66 opposite the out-turned ends are joined together by a transverse section which serves as a handle 72. When the loading arm 62 is in a lowered, roll receiving position as shown in FIG. 2, the curved legs 66 will be disposed at a relatively low height for having a roll of wrap material 74, including a tubular core 75 made of cardboard or the like, placed thereon either from the ground or preferably from a truck or wagon bed or the like so as to minimize or eliminate the need for lifting the roll, it being noted that a complete roll may weigh from 75-80 pounds. Once the roll 74 is cradled by the arcuate legs 66, the roll can be deposited on the bottom wall surface 45 by lifting up on the handle 72 and pivoting the handle to its raised, roll deposit position shown in FIG. 3. It is to be noted that the arm 62 is structured about its pivot axis such that the maximum lifting force needed to lift the roll is about one-half the roll weight and, that once the arm is in its roll deposit position it will remain there due to the action of gravity. In any event, a cover 76, respectively shown in an upwardly pivoted open position, in FIG. 2, and in a downwardly pivoted closed position in FIG. 3, may be lowered about respective strap hinges 78 connected between its upper forward portion and angle brackets 80 bolted to the flanges forming the rear edges of the gate walls 18.

Figure 4:
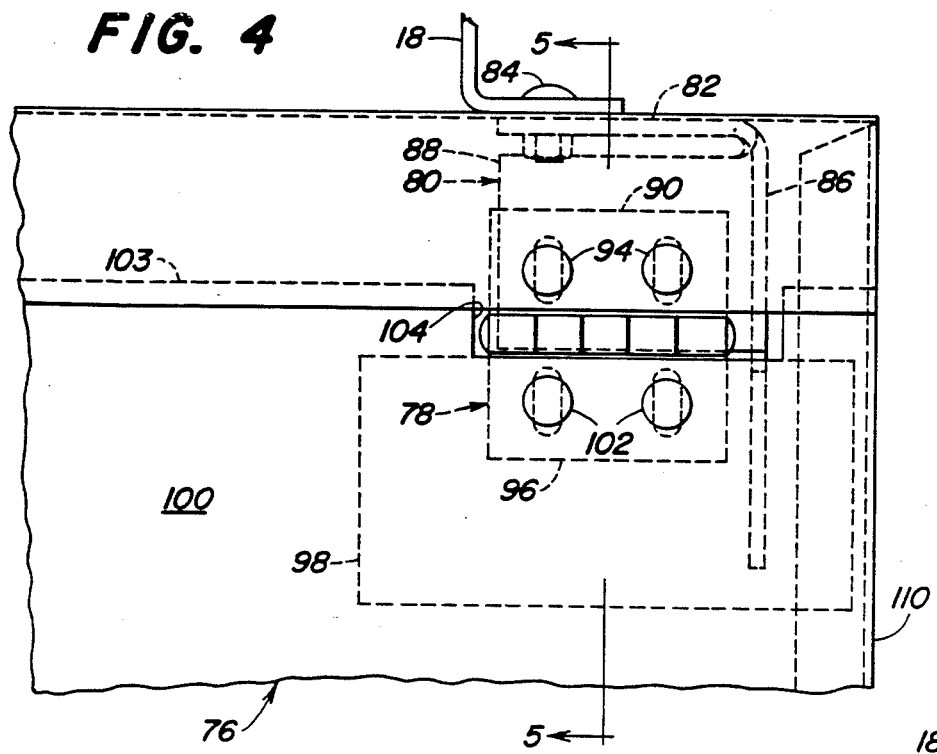
FIG. 4 is a top view of a right end portion of the cover showing the hinge structure.
Figure 5:
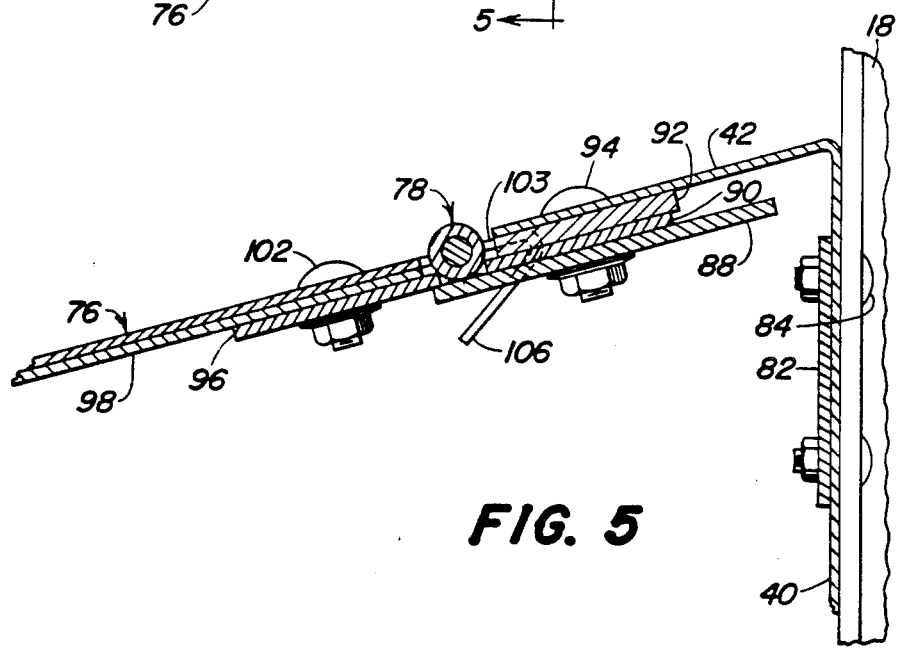
FIG. 5 is a vertical sectional view taken along the line 5—5 in FIG. 4.

Specifically, as can best be seen in FIGS. 4 and 5, the brackets 80 each include a vertical transverse portion 82 bolted, as at bolts 84, to a respective gate wall 18 and joined to a vertical longitudinally extending portion 86 having its upper end joined to a downwardly and rearwardly sloped transverse portion 88 located beneath and in parallel relationship to the front wall flange 42. The hinges 78 each include a forward portion 90 positioned on the bracket portion 88 and beneath a shim 92 engaged with the underside of the front wall flange 42, the hinge portion being fixed to the bracket portion 88 by bolts 94 received through aligned holes provided in the flange 42, the shim 92 and the bracket portion 88. The hinges 78 each include a rearward portion 96, which as viewed in FIGS. 3 and 5, is disposed against the underside of a stiffener plate 98 spot welded to the underside of and thus forming part of an upper and forwardly inclined top wall 100 of the cover 76 and is secured to the cover by a pair of bolts 102 extending through aligned holes provided in the top wall 100 and the hinge portion 96. It is here noted that the holes provided in the hinge portions 90 and 96 are elongated so as to permit the hinges to be properly aligned with each other to define a horizontal transverse pivot axis for the cover 76. As can best be seen in FIG. 4, a forward end portion 103 of the cover top wall 100 extends forwardly beyond the pivot joint formed by the hinges 78 and is notched, as at 104, to provide clearance for the joints. That portion of the cover top wall 100 that is located between the hinges 78 has a turned-back extended portion 106 so that sharp corners, which an operator might otherwise engage with his hands during loading of a new roll or wrap material onto the bottom wall 43 through use of the arm 62, are eliminated. Suitable padding, for example an elastomeric type strip seal, may be applied to the free edge of the turned-back portion 106 if additional protection is desired. Of importance is the fact that the forward end portion 103 of the top wall 100 extends beneath and seats against the underside of a rear marginal portion of the downwardly and rearwardly sloped flange 42 of the front wall 40. This engagement of the top wall end portion 103 with the flange 42 forms a seal which keeps water, dust and other particulates from entering the top of the housing when the cover is in its closed position. Also aiding in keeping foreign material out of the housing are the flanges 41 of the front wall 40, these flanges being disposed adjacent opposite side walls 110 of the cover when the latter is closed.

Provided for ensuring that the cover remains in its raised, open position (FIG. 2) or in its lowered, closed position (FIG. 3) after being moved thereto by an operator, a pair of gas springs 112 are mounted between the cover 76 and the brackets 80. Specifically, a pair of transversely spaced, spring mounting brackets 114 are fixed to the interior surface of a lower portion of a rear wall 116 of the cover. Each of the springs 112 is connected between one of the brackets 114 and the fore-and-aft portion 88 of one of the brackets 80. The line of action of the springs 112 is so disposed relative to the pivot axis defined by the hinges 78 that the line of action moves over center relative to the pivot axis when the cover is swung between its open and closed positions, with the line of action being disposed such that cover is biased downwardly about the pivot axis, when the cover is closed, and upwardly about the pivot axis when the cover is open. Thus, it will be appreciated that not only do the springs serve to maintain the cover 76 in proper position for maintaining the effectiveness of the seal formed between the cover top and front wall but also acts to maintain the cover in its raised position wherein an operator may manipulate the wrap loading arm 62 to replenish the supply of bale surface wrap material without the cover interfering with such action. The operation of the cover hinge structure for effectively sealing the housing when the cover is closed, without the use of sealing strips or the like, for preventing foreign matter from entering the same and possibly affecting the frictional characteristics of the wrap material is thought to be clear from the above description and, for the sake of brevity, will not be reiterated.

We claim:

1. In a large round baler including support structure adjacent a bale-forming chamber, a bale wrapping mechanism mounted to the support structure and including a wrap material supply roll housing adapted for holding a supply roll from which wrap material is pulled during wrapping a bale located in the chamber, the improvement comprising: said housing including a generally upright first wall extending transversely across the bale-forming chamber and including an upper end portion defined by a flange extending away from said chamber; an upwardly facing wrap material roll support wall disposed below the flange and arranged for supporting a roll of bale surface wrap material in a zone adjacent the first wall and below said flange; a cover defined by top, bottom, opposite side and an upright second wall joined together to define an open face and for enclosing a roll of wrap material located in said zone when the cover is in a closed position, the face then being closed by said first upright wall; and hinge means pivotally connecting said cover to said support structure for pivotal movement about a horizontal transverse axis between said closed position, wherein said top wall has an upper surface portion sealingly engaged with an under surface portion of the flange of the upright first wall and an open position wherein said open face is directed away from said first upright wall.

2. The invention as defined in claim 1 wherein said support structure includes a pair of transversely spaced brackets located beneath and adjacent the flange of the upright first wall; and said hinge means comprising a pair of strap hinges each having first portions secured to one of the brackets and second portions secured to the top wall of the cover.

3. The invention as defined in claim 1 wherein said upright first wall has opposite transversely spaced sides respectively defined by a pair of upright flanges; and the opposite side walls of said cover being spaced apart so as to respectively be disposed closely adjacent said upright flanges when the cover is closed.

4. The invention as defined in claim 1 and further including biasing means connected between the cover and said support structure and having a line of action located relative to said pivot axis such that the biasing means moves over center when the cover is moved between open and closed positions and acts to bias the cover towards its closed position when the cover is placed in its closed position and acts to bias the cover to its open position when the cover is placed in its open position.

5. The invention as defined in claim 4 wherein said biasing means comprises a pair of gas springs.

* * * * *